United States Patent
Kobayashi et al.

(10) Patent No.: US 8,045,291 B2
(45) Date of Patent: Oct. 25, 2011

(54) PERPENDICULAR MAGNETIC RECORDING HEAD AND MANUFACTURING METHOD THEREOF

(75) Inventors: Kiyoshi Kobayashi, Niigata-ken (JP); Tomoo Otsuka, Niigata-ken (JP)

(73) Assignee: TDK Corporation, Tokyo (JP)

(*) Notice: Subject to any disclaimer, the term of this patent is extended or adjusted under 35 U.S.C. 154(b) by 901 days.

(21) Appl. No.: 12/038,343

(22) Filed: Feb. 27, 2008

(65) Prior Publication Data

US 2008/0225436 A1 Sep. 18, 2008

(30) Foreign Application Priority Data

Mar. 15, 2007 (JP) ................................ 2007-066412

(51) Int. Cl.
*G11B 5/31* (2006.01)
(52) U.S. Cl. ................................. 360/125.19
(58) Field of Classification Search .............. 360/125.19
See application file for complete search history.

(56) References Cited

U.S. PATENT DOCUMENTS

| | | | | |
|---|---|---|---|---|
| 6,751,054 B2* | 6/2004 | Sato et al. | ................ | 360/125.06 |
| 7,492,551 B2* | 2/2009 | Matono | ................ | 360/125.17 |
| 7,497,009 B2* | 3/2009 | Kobayashi | ................ | 29/603.16 |
| 7,742,259 B2* | 6/2010 | Kameda et al. | ........... | 360/125.02 |
| 7,852,603 B2* | 12/2010 | Kobayashi et al. | ...... | 360/125.06 |

FOREIGN PATENT DOCUMENTS

| | | |
|---|---|---|
| JP | 2004-039148 | 2/2004 |
| JP | 2004-280921 | 10/2004 |

* cited by examiner

*Primary Examiner* — Mark Blouin
(74) *Attorney, Agent, or Firm* — Brinks Hofer Gilson & Lione

(57) ABSTRACT

A perpendicular magnetic recording head includes a main magnetic pole layer exposed to an opposing surface opposite a recording medium, applying a perpendicular recording magnetic field to the recording medium; a return yoke layer disposed in the opposing surface opposite the recording medium above or below the main magnetic pole layer, the return yoke layer receiving the recording magnetic field returning thereto after passing through the recording medium; and a planarized nonmagnetic layer filling the surroundings of the return yoke layer to planarized the return yoke layer. Inclined or curved surfaces are formed at both sides in a track width direction of the return yoke layer, the inclined or curved surfaces gradually broadening the dimension of the return yoke layer in the track width direction as the inclined or curved surfaces extend from front end surfaces thereof exposed to the opposing surface opposite the recording medium in the height direction. A cohesive layer is disposed between the return yoke layer and the planarized nonmagnetic layer to increase the cohesive properties between the return yoke layer and the planarized nonmagnetic layer compared with the case in which the return yoke layer is directly connected to the planarized nonmagnetic layer.

20 Claims, 3 Drawing Sheets

PERPENDICULAR MAGNETIC RECORDING HEAD AND MANUFACTURING METHOD THEREOF

RELATED APPLICATIONS

This application claims the benefit of priority under 35 U.S.C. §119 to Japanese Patent Application No. 2007-066412 filed Mar. 15, 2007, the contents of which are hereby incorporated by reference in their entirety.

BACKGROUND OF THE DISCLOSURE

1. Field of the Disclosure

The present disclosure relates to a perpendicular magnetic recording head that records information by applying a perpendicular magnetic field to a recording medium, and to a manufacturing method thereof.

2. Description of the Related Art

As is widely known, a perpendicular magnetic recording head has a main magnetic pole layer, a return path layer, a nonmagnetic insulating layer that is disposed between the main magnetic pole layer and the return yoke layer, and a recording coil layer that is disposed in the nonmagnetic insulating layer and that provides a recording magnetic field to the main magnetic pole layer and the return yoke layer. The main magnetic pole layer and the return yoke layer are disposed in a recording medium with a predetermined spacing defined therebetween. The main magnetic pole layer is magnetically coupled to the return yoke layer at the side remote from an opposing surface opposite the recording medium in the height direction. Once electricity is supplied to the recording coil layer, a recording magnetic field is induced between the main magnetic pole layer and the return yoke layer and flows in the recording medium-opposing surface between the main magnetic pole layer and the return yoke layer, thereby generating a recording magnetic field. The recording magnetic field enters a hard film of the recording medium in a perpendicular fashion from a front end surface of the main magnetic pole layer exposed to the recording medium-opposing surface. The recording magnetic field passes through a soft film of the recording medium and returns to the return yoke layer to thereby complete magnetic recording on the recording medium in the portion that opposes the main magnetic pole layer. In the vicinity of the return yoke layer, in order to secure a patterning precision of layers to be laminated above the return yoke layer, a planarized nonmagnetic layer composed of a nonmagnetic material such as $Al_2O_3$ or $SiO_2$ is formed. A planarizing process is performed so that the upper surface of the planarized nonmagnetic layer and the upper surface of the return yoke layer are disposed on the same surface.

In such a perpendicular magnetic recording head, the return yoke layer is generally formed in a rectangular shape in top view. However, when the return yoke layer is formed in the rectangular top shape, an external magnetic field or the recording magnetic field returning from the recording medium is likely to concentrate on angular parts of the return yoke layer including the front end surface thereof exposed to the recording medium-opposing surface and both end surfaces thereof in the track width direction. In such angular parts of the return yoke layer, information is unintentionally written to or erased from the recording medium. According to a proposal regarding prevention of the undesired writing or erasure by the return yoke layer, inclined or curved surfaces are formed at both sides of a return yoke layer (or an auxiliary magnetic pole layer) in the track width direction. The inclined or curved surfaces gradually broaden the dimension of the return yoke layer in the track width direction as the inclined or curved surfaces extend from a front end surface of the return yoke layer exposed to the recording medium-opposing surface in the height direction. A perpendicular magnetic recording head having such inclined or curved surfaces is disclosed in Japanese Unexamined Patent Application Publication Nos. 2004-039148 and 2004-280921. According to the perpendicular magnetic recording head, an external magnetic field or the recording magnetic field returning from the recording medium is absorbed by a wide range of areas of the inclined or curved surfaces, thereby suppressing the recording magnetic field concentration. Therefore, it is possible to prevent the undesired writing or erasure by the return yoke layer, thereby improving resistance to an external magnetic field and reliability.

However, when the inclined or curved surfaces are formed at both side of the return yoke layer in the track width direction, a planarized nonmagnetic layer that is exposed to the recording medium-opposing surface and that covers from the recording medium-opposing surface to the inclined or curved surfaces peels off or cracks during a polishing processing for forming the recording medium-opposing surface or during a post-process cleaning (ultrasonic cleaning). Although the resistance to the external magnetic field increases as the angle (an angle between the recording medium-opposing surface and the inclined or curved surfaces) of the inclined or curved surfaces at both sides of the return yoke layer in the track width direction decreases, the peeling or cracking of the planarized nonmagnetic layer becomes more prominent as the angle decreases.

SUMMARY OF THE DISCLOSURE

The present disclosure provides a perpendicular magnetic recording head that includes a main magnetic pole layer exposed to an opposing surface opposite a recording medium, applying a perpendicular recording magnetic field to the recording medium; a return yoke layer disposed in the opposing surface opposite the recording medium above or below the main magnetic pole layer, the return yoke layer receiving the recording magnetic field returning thereto after passing through the recording medium; and a planarized nonmagnetic layer filling the surroundings of the return yoke layer to planarized the return yoke layer. Surfaces, such as inclined or curved surfaces, are formed at both sides in a track width direction of the return yoke layer, the surfaces gradually broadening the dimension of the return yoke layer in the track width direction as the surfaces extend from front end surfaces thereof exposed to the opposing surface opposite the recording medium in the height direction. A cohesive layer is disposed between the return yoke layer and the planarized nonmagnetic layer to increase the cohesive properties between the return yoke layer and the planarized nonmagnetic layer compared with the case in which the return yoke layer is directly connected to the planarized nonmagnetic layer.

The present disclosure also provides a perpendicular magnetic recording head that includes a main magnetic pole layer exposed to an opposing surface opposite a recording medium, applying a perpendicular recording magnetic field to the recording medium; a return yoke layer disposed in the opposing surface opposite the recording medium above or below the main magnetic pole layer, the return yoke layer receiving the recording magnetic field returning thereto after passing through the recording medium; a magnetoresistive element that read recording information from the recording medium using a magnetoresistance effect; and a pair of shield layers disposed on and under the magnetoresistive element and having surfaces, such as inclined or curved surfaces, formed at both sides in a track width direction of the shield layers, the surfaces gradually broadening the dimension of the shield layers in the track width direction as the inclined or curved surfaces extend from front end surfaces thereof exposed to the opposing surface opposite the recording medium in the height direction; and a planarized nonmagnetic layer filling the surroundings of the shield layers to planarized the shield layers. A cohesive layer is disposed between the shield layers and the planarized nonmagnetic layer to increase the cohesive properties between the shield layers and the planarized nonmagnetic layer compared with the case in which the shield layers are directly connected to the planarized nonmagnetic layer.

The present disclosure provides a manufacturing method of a perpendicular magnetic recording head, comprising: forming a return yoke layer having survaces, such as inclined or curves surfaces, at both sides in the track width direction of the return yoke layer, the surfaces broadening the dimension of the return yoke layer in the track width direction as the surfaces extend from a position serving as an opposing surface opposite a recording medium in the height direction; forming a cohesive layer over the upper and side surfaces of the return yoke layer, the cohesive layer increasing the cohesive properties between the return yoke layer and a planarized nonmagnetic layer to be formed in a subsequent step, compared with the case in which the return yoke layer is directly connected to the planarized nonmagnetic layer; forming the planarized nonmagnetic layer on the cohesive layer to such a thickness that the return yoke layer and the surroundings thereof are covered; and performing a polishing process to the planarized nonmagnetic layer until the return yoke layer is exposed, thereby planarizing the upper surface of the return yoke layer.

The present disclosure also provides a manufacturing method of a perpendicular magnetic recording head, comprising: forming shield layers above or below a magnetoresistive element, having surfaces, such as inclined or curves surfaces, at both sides in the track width direction of the shield layers, the surfaces broadening the dimension of the shield layers in the track width direction as the surfaces extend from a position serving as an opposing surface opposite a recording medium in the height direction; forming a cohesive layer over the upper and side surfaces of the shield layers, the cohesive layer increasing the cohesive properties between the shield layers and a planarized nonmagnetic layer to be formed in a subsequent step, compared with the case in which the shield layers are directly connected to the planarized nonmagnetic layer; forming the planarized nonmagnetic layer on the cohesive layer to such a thickness that the shield layers and the surroundings thereof are covered; and performing a polishing process to the planarized nonmagnetic layer until the shield layers are exposed, thereby planarizing the upper surfaces of the shield layers.

BRIEF DESCRIPTION OF THE DRAWINGS

The components in the figures are not necessarily to scale, emphasis instead being placed upon illustrating the principles of the invention. Moreover, in the figures, like reference numerals designate corresponding parts throughout the different views.

DESCRIPTION OF THE EMBODIMENTS

Exemplary embodiments may be better understood with reference to the drawings, but these examples are not intended to be of a limiting nature. Like numbered elements in the same or different drawings perform equivalent functions.

The present disclosure will now be described with reference to drawings, covering various non-exhaustive embodiments. In each of the drawings, the X direction is the track width direction, the Y direction is the height direction, and the Z direction is the lamination direction in which the layers constituting a thin film magnetic head are laminated, or the moving direction of a recording medium M.

Figure 1:
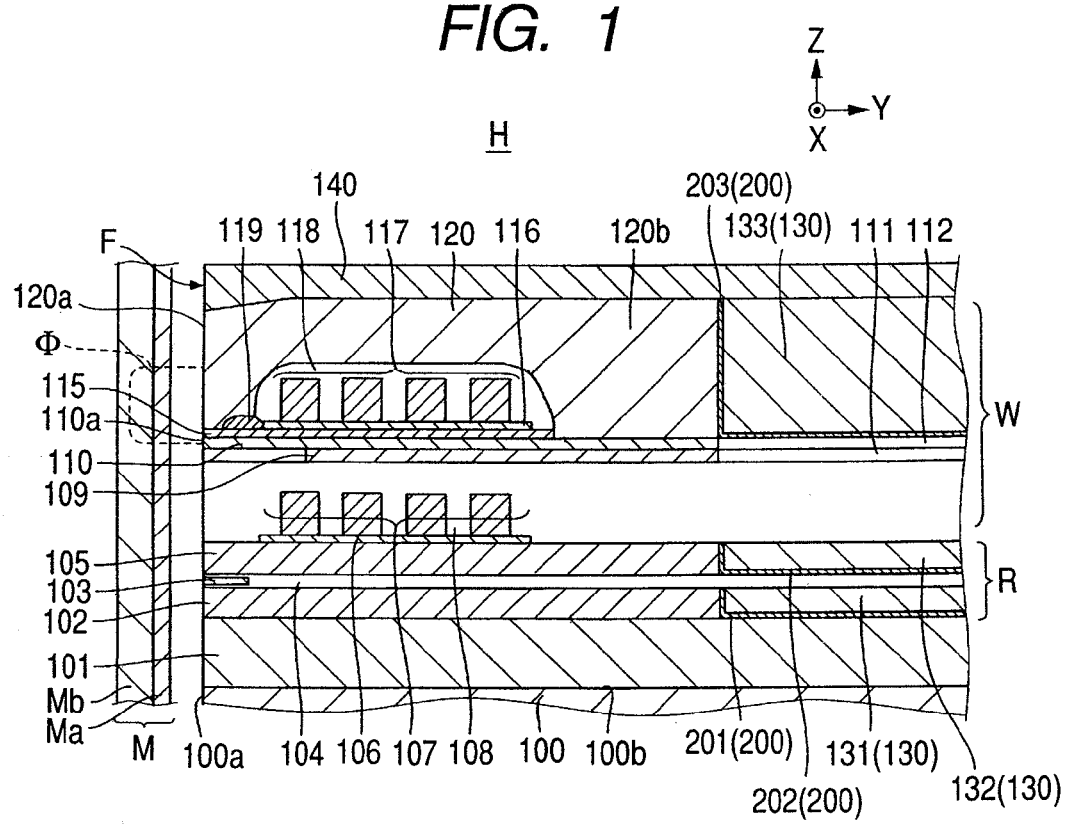
FIG. 1 is a sectional view showing a laminated structure of a thin film magnetic head according to the present disclosure, taken along the center line of the head, corresponding to a sectional view taken along line I-I of FIG. 3.
Figure 2:
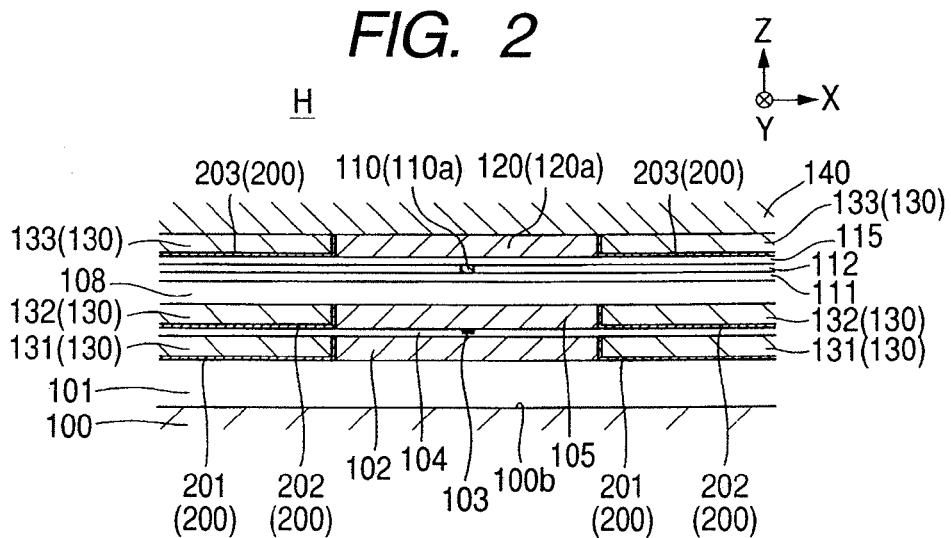
FIG. 2 is a sectional view of the laminated structure of the thin film magnetic head, as viewed from a recording medium-opposing surface.
Figure 3:
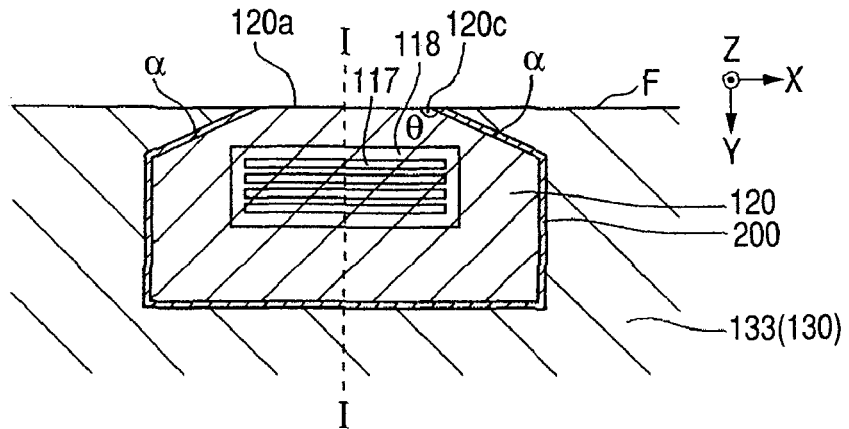
FIG. 3 is a top view of the thin film magnetic head.
Figure 4A:
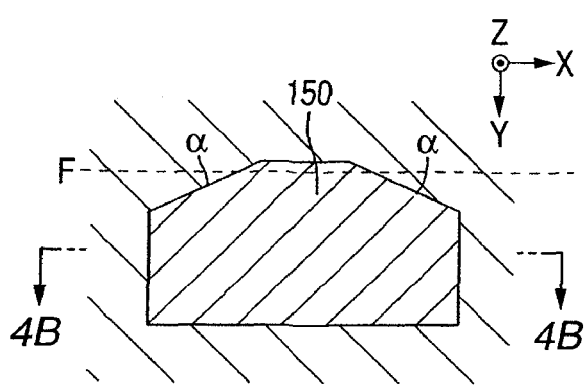
FIGS. 4A and 4B are top and sectional views showing a process step of a manufacturing method of the thin film magnetic head.
Figure 4B:
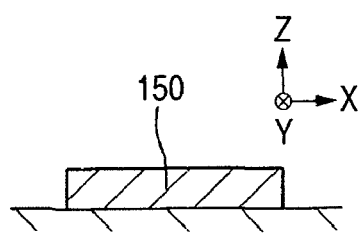
Figure 5A:
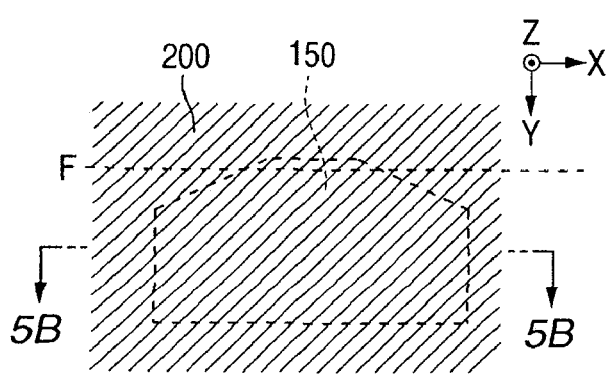
FIGS. 5A and 5B are top and sectional views showing a process step subsequent to the process step shown in FIG. 4.
Figure 5B:
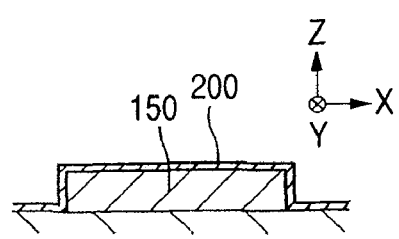
Figure 6A:
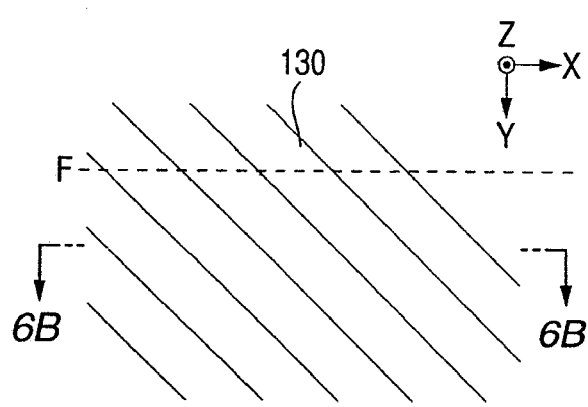
FIGS. 6A and 6B are top and sectional views showing a process step subsequent to the process step shown in FIG. 5.
Figure 6B:
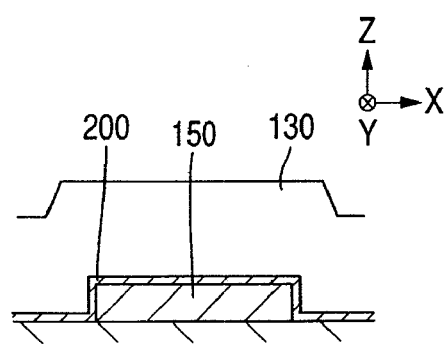
Figure 7A:
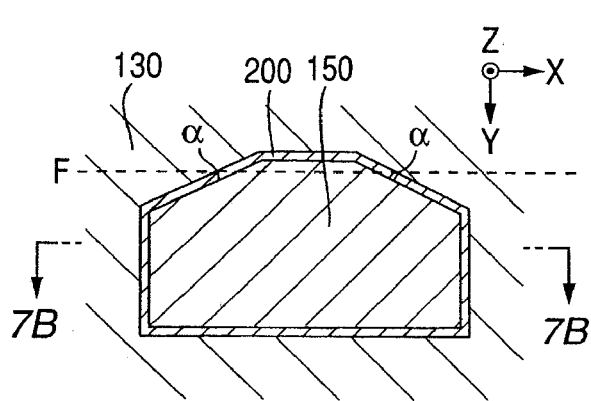
FIGS. 7A and 7B are top and sectional views showing a process step subsequent to the process step shown in FIG. 6.
Figure 7B:
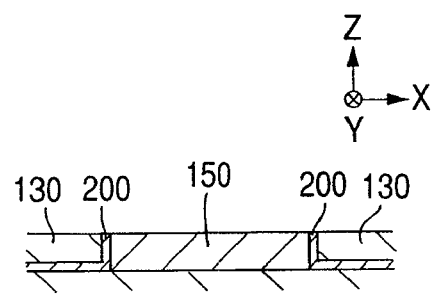

FIG. 1 is a longitudinal sectional view showing a laminated structure of a thin film magnetic head H according to the present disclosure, taken along the center line of the head. FIG. 2 is a sectional view of the laminated structure of the thin film magnetic head H, as viewed from a recording medium-opposing surface. FIG. 3 is a top view of the thin film magnetic head H, as viewed from the above (a protective layer 140 side).

The thin film magnetic head H is a perpendicular magnetic recording head that includes a read section R constituted from thin films laminated on a slider (a head substrate) 100, and a write section W. The read section R reads magnetic information from a recording medium M using a magnetoresistance effect. The write section W performs a write operation by applying a perpendicular magnetic field Φ to the recording medium M to thereby magnetize a hard film Ma of the recording medium M in the perpendicular direction.

The recording medium M includes the hard film Ma with a higher residual magnetization at the surface side and a soft film Mb with a higher magnetic permeability at the inner side of the hard film Ma. The recording medium M is, for example, disk-shaped and is rotated by a spindle motor about the center of the disk, which serves as the axis of rotation. The slider 100 is composed of $Al_2O_3$ or TiC. An end surface 100a of the slider 100 opposes the recording medium M. As the recording medium M is rotated, the slider 100 floats up from the surface of the recording medium M by the airflow on the surface.

An undercoat film 101 composed of $Al_2O_3$ is formed on the trailing side-end surface 100b of the slider 100. On the undercoat film 101, a lower shield layer 102, an upper shield layer 105, a gap insulating layer 104 that fills the space between the lower shield layer 102 and the upper shield layer 105, and a multi-layered film 103 located in the gap insulating layer 104 are disposed. The multi-layered film 103 is a magnetoresistive (MR) element such as AMR (anisotropic MR), GMR (giant MR), and TMR (tunneling MR). In the vicinity of the lower shield layer 102 and the upper shield layer 105, a planarized nonmagnetic layer 130 (including a first planarized nonmagnetic layer 131 and a second planarized nonmagnetic layer 132) is formed. The planarized nonmagnetic layer 130 is composed of a nonmagnetic material such as $Al_2O_3$, $SiO_2$, Ta, or DLC (diamond-like carbon). The planarized nonmagnetic layer 131 is planarized such that the upper surface of the lower shield layer 102 and the upper surface of the first planarized nonmagnetic layer 131 are disposed on the same surface, and that the upper surface of the upper shield layer 105 and the second planarized nonmagnetic layer 132 are disposed on the same surface.

The write section W is laminated on the upper shield layer 105. The write section W includes a main magnetic pole layer 110 and a return yoke layer 120 composed of a ferromagnetic material having a high saturation magnetic flux density such as Ni—Fe, Co—Fe, or Ni—Fe—Co. The write section W further includes a magnetic gap layer 115 disposed in an opposing surface (a recording medium-opposing surface) F opposite the recording medium M. The magnetic gap layer 115 is composed of a nonmagnetic material such as $Al_2O_3$, $SiO_2$, Au, or Ru. The write section W further includes a coil layer (107 and 117) for applying a recording magnetic field to the main magnetic pole layer 110. The write section W further includes an auxiliary yoke layer 109 right below the main magnetic pole layer 110. The auxiliary yoke layer 109 is composed of a magnetic material having a saturation magnetic flux density lower than that of the main magnetic pole layer 110. The write section W further includes a height determining layer 119 disposed on the magnetic gap layer 115 at a position retreated from the recording medium-opposing surface F by a predetermined distance.

The main magnetic pole layer 110 has a front end surface 110a exposed to the recording medium-opposing surface F. The dimension of the front end surface 110a in the X direction of the drawing is defined as a write track width. The return yoke layer 120 opposes the main magnetic pole layer 110 with a predetermined spacing (gap spacing) defined in a front end surface 120a that is exposed to the recording medium-opposing surface F. The return yoke layer 120 is connected to the main magnetic pole layer 110 at a connecting part 120b that is disposed at a deeper side than the front end surface 120a in the height direction. In the vicinity of the main magnetic pole layer 110 and the auxiliary yoke layer 109, inorganic insulating layers 111 and 112 composed of $Al_2O_3$, $SiO_2$, Al—Si—O, or the like are formed. The inorganic insulating layers 111 and 112 are planarized such that the upper surface of the main magnetic pole layer 110 and the upper surface of the inorganic insulating layer 112 are disposed on the same surface, and that the upper surface of the auxiliary yoke layer 109 and the upper surface of the inorganic insulating layer 111 are disposed on the same surface. The auxiliary yoke layer 109 is disposed at a position retreated from the recording medium-opposing surface F by a predetermined distance. As shown in FIG. 2, in the recording medium-opposing surface F, the auxiliary yoke layer 109 right below the front end surface 110a of the main magnetic pole layer 110 is not exposed and the inorganic insulating layer 111 is exposed. In the vicinity of the return yoke layer 120, a planarized nonmagnetic layer 130 (a third planarized nonmagnetic layer 133) composed of a nonmagnetic material such as $Al_2O_3$, $SiO_2$, Ta, or DLC is formed. The planarized nonmagnetic layer 130 is planarized such that the upper surface of the return yoke layer 120 and the upper surface of the third planarized nonmagnetic layer 133 are disposed on the same surface.

Lower layer coils 107 are laminated on a coil insulating underlayer 106 formed on the upper shield layer 105. Upper layer coils 117 are laminated on a coil insulating underlayer 116 formed on the magnetic gap layer 115. The lower layer coils 107 and the upper layer coils 117 are formed by arranging a plurality of coils extending in the track width direction so as to extend in the height direction. The lower layer coils 107 and the upper layer coils 117 have their respective ends electrically connected to each other to be wound around the main magnetic pole layer 110 and the auxiliary yoke layer 109 such that they form a solenoid. The lower layer coils 107 and the upper layer coils 117 are each formed, for example, of at least one or two nonmagnetic metal materials selected from the group consisting of Au, Cu, Al, Pt, Ag, W, Ni, NiP, Rh, Fe, Co, Cr, Ta, and Ti. The lower layer coils 107 and the upper layer coils 117 are covered with coil insulating layers 108 and 118 composed of an inorganic insulating material or an organic insulating material. The upper surfaces of the coil insulating layers 108 and 118 are planarized, and the auxiliary yoke layer 109 and the return yoke layer 120 are formed on the respective planarized surfaces. A protective layer 140 composed of $Al_2O_3$ is formed on the return yoke layer 120 and the third planarized nonmagnetic layer 133.

As shown in FIG. 3, inclined surfaces α are formed at both side in the track width direction of the return yoke layer 120. The inclined surfaces α gradually broaden the dimension of the return yoke layer 120 in the track width direction as the inclined surfaces α extend from the front end surface 120a exposed to the recording medium-opposing surface F to the deeper side in the height direction. Angular parts 120c are formed between the front end surface 120a and the inclined surfaces α. Since the angular parts 120c (angles θ between the front end surface 120a and the inclined surfaces α) are obtuse angled, the perpendicular recording magnetic field Φ returning to the return yoke layer 120 after passing through the recording medium M or an external magnetic field is not concentrated on the angular parts 120c but distributed over a wide range of areas of the front end surface 120a or the inclined surfaces α. Therefore, even when the intensity of the perpendicular recording magnetic field Φ is increased, the intensity of a magnetic field generated from the angular parts 120c is suppressed. It is thus possible to prevent a problem that unintentional recording or erasure is performed by the angular parts 120c. With this, it is possible to provide recording characteristics complying with higher recording density.

Although not shown in FIG. 3, similar to the inclined surfaces α formed on the return yoke layer 120, inclined surfaces are also formed at both sides of the lower shield layer 102 and the upper shield layer 105. The inclined surfaces gradually broaden the dimension of the lower shield layer 102 and the upper shield layer 105 in the track width direction as the inclined surfaces extend from the front end surfaces exposed to the recording medium-opposing surface F to the deeper side in the height direction. The lower shield layer 102 and the upper shield layer 105 are exposed to the recording medium-opposing surface F. When angular parts (right-angle parts) composed of a magnetic material are present in the vicinity of the recording medium-opposing surface F, there is a possibility of magnetic field concentration. For this reason, in this embodiment, by forming the inclined surfaces in the lower shield layer 102 and the upper shield layer 105 in a manner similar to the inclined surfaces α of the return yoke layer 120, the magnetic field concentration in portions of the recording medium-opposing surface F other than the main magnetic pole layer 110 is suppressed.

In the thin film magnetic head H having such a construction, an cohesive layer 200 (a third cohesive layer 203) is provided between the return yoke layer 120 and the third planarized nonmagnetic layer 133 filling the surroundings of the return yoke layer 120. The cohesive layer 200 is composed of at least one material selected from the group consisting of Ti, Cr, Ta, Zr, and Hf. Alternatively, the cohesive layer 200 may be a laminate or compound containing one material selected from the group consisting of Ti, Cr, Ta, Zr, and Hf, or oxides or nitrides thereof. The cohesive layer 200 increases the cohesive properties between the return yoke layer 120 and the third planarized nonmagnetic layer 133 compared with the case in which the return yoke layer 120 is directly in contact with the third planarized nonmagnetic layer 133. In this embodiment, since the return yoke layer 120 is formed of Ni—Fe (permalloy) and the third planarized nonmagnetic layer 133 is formed of $Al_2O_3$, the cohesive layer 200 is formed of Ti. The thickness of the cohesive layer 200 is about 10 Å to about 500 Å. Since the cohesive layer 200 is disposed between the return yoke layer 120 and the third planarized nonmagnetic layer 133, the third planarized nonmagnetic layer 133 can have a sufficient mechanical strength in the narrow portion extending from the recording medium-opposing surface F to the inclined surfaces α of the return yoke layer 120. With this, during a polishing process for forming the recording medium-opposing surface F or during operation of the head, it is possible to prevent peeling or cracking of the third planarized nonmagnetic layer 133 exposed to the recording medium-opposing surface F.

Similarly, cohesive layers 200 (first and second cohesive layers 201 and 202) are provided between the lower shield layer 102 and the first planarized nonmagnetic layer 131 filling the surroundings of the lower shield layer 102 and between the upper shield layer 105 and the second planarized nonmagnetic layer 132 filling the surroundings of the upper shield layer 105. In this embodiment, since the lower shield layer 102 and the upper shield layer 105 are formed of Ni—Fe (permalloy) similar to the return yoke layer 120 and the first planarized nonmagnetic layer 131 and the second nonmagnetic layer 132 are formed of $Al_2O_3$ similar to the third planarized nonmagnetic layer 133, the first and second cohesive layers 201 and 202 are formed of Ti similar to the third cohesive layer 203. Since the first cohesive layer 201 is disposed between the lower shield layer 102 and the first planarized nonmagnetic layer 131 and the second cohesive layer 202 is disposed between the upper shield layer 105 and the second planarized nonmagnetic layer 132, the first and second planarized nonmagnetic layers 131 and 132 can have a sufficient mechanical strength in the narrow portion extending from the recording medium-opposing surface F to the inclined surfaces of the lower shield layer 102 and the upper shield layer 105. With this, during a polishing process for forming the recording medium-opposing surface F or during operation of the head, it is possible to prevent peeling or cracking of the first and second planarized nonmagnetic layers 131 and 132 exposed to the recording medium-opposing surface F.

Next, a manufacturing method of the thin film magnetic head H shown in FIGS. 1 to 3 will be described with reference to FIGS. 4 to 7. FIGS. 4A, 5A, 6A, and 7A are top view showing a process step of the manufacturing method of the thin film magnetic head H, and FIGS. 4B, 5B, 6B, and 7B are sectional views taken along line A-A of FIGS. 4A, 5A, 6A, and 7A.

Since the return yoke layer 120, the lower shield layer 102, and the upper shield layer 105 of this embodiment are all formed of Ni—Fe (permalloy) and can be formed by the same process steps, they will be referred to as Ni—Fe layer 150 without distinguishing the return yoke layer 120, the lower shield layer 102, and the upper shield layer 105 from each other. In addition, since the first to third planarized nonmagnetic layers 131 to 133 are all formed of $Al_2O_3$ and can be formed by the same process steps, they will be referred to as a planarized nonmagnetic layer 130 without distinguishing the first to third layers from each other. Similarly, since the first to third cohesive layers 201 to 203 are all formed of Ti and can be formed by the same process steps, they will be referred to as a cohesive layer 200 without distinguishing the first to third layers from each other.

In the following descriptions, only a process step for forming the cohesive layer 200 disposed between the Ni—Fe layer 150 and the planarized nonmagnetic layer 130 will be described. Since layers other than the above layers can be formed using an ordinary method, process steps for forming such layers will be omitted.

First, as shown in FIG. 4, the Ni—Fe layer 150, which constitutes the lower shield layer 102, the upper shield layer 105 or the return yoke layer 120, is formed in a planar shape such that inclined surfaces α are formed at both sides in the track width direction of the Ni—Fe layer 150, the inclined surfaces gradually broadening the dimension in the track width direction as the inclined surfaces extend from a position (denoted by the broken line in FIG. 4) serving as the recording medium-opposing surface F in the height direction. The Ni—Fe layer 150 can be formed by a photolithographic process or a plating method. The Ni—Fe layer 150 is formed on the undercoat film 101 if the lower shield layer 102 is to be formed. The Ni—Fe layer 150 is formed on the gap insulating layer 104 if the upper shield layer 105 is to be formed. The Ni—Fe layer 150 is formed on the main magnetic pole layer 110 and the coil insulating layer 118 if the return yoke layer 120 is to be formed.

Next, as shown in FIG. 5, the cohesive layer 200 composed of Ti is formed over the upper and side surfaces of the Ni—Fe layer 150. A sputter method or vapor deposition method is used in forming the cohesive layer 200. The film thickness of the cohesive layer 200 is about 10 Å to about 500 Å.

Subsequently, as shown in FIG. 6, the planarized nonmagnetic layer 130 composed of $Al_2O_3$ is formed on the cohesive layer to such a thickness that the Ni—Fe layer 150 and the surroundings are completely covered. The planarized nonmagnetic layer 130 composed of $Al_2O_3$ is formed by a sputter method.

Once the planarized nonmagnetic layer 130 is formed, as shown in FIG. 7, a polishing processing (CMP: chemical mechanical polishing) is performed to the planarized nonmagnetic layer 130 to such a position that the upper surface of the Ni—Fe layer 150 is exposed. By the polishing processing, the upper surface 150a of the Ni—Fe layer 150 and the upper surface 130a of the planarized nonmagnetic layer 130 are disposed on the same surface (planarized surface).

As a result of the above process steps, the cohesive layer 200 is formed between the planarized nonmagnetic layer 130 and the Ni—Fe layer 150, which constitutes the lower shield layer 102, the upper shield layer 105 or the return yoke layer 120. In this embodiment, although the cohesive layer 200 is left below the planarized nonmagnetic layer 130, the cohesive layer 200 below the planarized nonmagnetic layer 130 may be removed.

According to the embodiment described above, the third cohesive layer 203 is disposed between the return yoke layer 120 and the third planarized nonmagnetic layer 133. The cohesive strength between the return yoke layer 120 and the third planarized nonmagnetic layer 133 is increased compared with the case in which the return yoke layer 120 is directly connected to the third planarized nonmagnetic layer 133. The third planarized nonmagnetic layer 133 can therefore have a sufficient mechanical strength in the narrow portion extending from the recording medium-opposing surface F to the inclined surfaces α formed at both sides of the return yoke layer 120 in the track width direction. With this, even when a polishing process is performed up to a position serving as the recording medium-opposing surface F shown in FIG. 7 or when a post-process cleaning is performed thereto, and when an external force is applied during operation of the head, it is possible to prevent peeling or cracking of the third planarized nonmagnetic layer 133 exposed to the recording medium-opposing surface F.

According to the embodiment described above, the first cohesive layer 201 and the second cohesive layer 202 are disposed between the lower shield layer 102 and the first planarized nonmagnetic layer 131 and between the upper shield layer 105 and the second planarized nonmagnetic layer 132, respectively. The cohesive strength between the lower shield layer 102 and the first planarized nonmagnetic layer 131 and between the upper shield layer 105 and the second planarized nonmagnetic layer 132 is increased compared with the case in which the lower shield layer 102 and the upper shield layer 105 are directly connected to the first planarized nonmagnetic layer 131 and the second planarized nonmagnetic layer 132, respectively. The first and second planarized nonmagnetic layers 131 and 132 can therefore have a sufficient mechanical strength in the narrow portion extending from the recording medium-opposing surface F to the inclined surfaces formed at both sides of the first and second shield layers 102 and 105 in the track width direction. With this, even when a polishing process is performed up to a position serving as the recording medium-opposing surface F shown in FIG. 7 and when an external force is applied during operation of the head, it is possible to prevent peeling or cracking of the first and second planarized nonmagnetic layers 131 and 132 exposed to the recording medium-opposing surface F.

In the embodiment described above, although the lower shield layer 102, the upper shield layer 105, and the return yoke layer 120 have respective inclined surfaces, instead of the inclined surfaces, curved surfaces may be formed in the lower shield layer 102, the upper shield layer 105, and the return yoke layer 120. A perpendicular magnetic recording head may include a magnetic layer exposed to the recording medium-opposing surface in addition to the lower shield layer, the upper shield layer, and the return yoke layer. In such a perpendicular magnetic recording head, inclined or curved surfaces may be formed at both sides of the magnetic layer in the track width direction such that the dimension in the track width direction of the magnetic layer is gradually increased as the inclined or curved surfaces extend from the recording medium-opposing surface in the height direction. A cohesive layer may be formed between the magnetic layer and a planarized nonmagnetic layer filling the surroundings of the magnetic layer. The return yoke layer may have a floating shield layer that is not magnetically coupled to the main magnetic pole layer.

The terms and descriptions used herein are set forth by way of illustration only and are not meant as limitations. Those skilled in the art will recognize that many variations can be made to the details of the above-described embodiments without departing from the underlying principles of the disclosure. The scope of the disclosure should therefore be determined only by the following claims (and their equivalents) in which all terms are to be understood in their broadest reasonable sense unless otherwise indicated.

What is claimed is:

1. A perpendicular magnetic recording head, comprising:
   a main magnetic pole layer exposed to an opposing surface opposite a recording medium, applying a perpendicular recording magnetic field to the recording medium;
   a return yoke layer disposed in above or below the main magnetic pole layer, the return yoke layer receiving the recording magnetic field returning thereto after passing through the recording medium; and
   a planarized nonmagnetic layer filling the surroundings of the return yoke layer,
   wherein the return yoke layer has two side surfaces and a front end surface positioned between the two side surfaces, the front end surface being formed in the opposing surface;
   wherein a width between the two side surfaces increases as a distance from the front end surface increases; and
   wherein a cohesive layer is disposed between the return yoke layer and the planarized nonmagnetic layer to increase the cohesive properties between the return yoke layer and the planarized nonmagnetic layer compared with the case in which the return yoke layer is directly connected to the planarized nonmagnetic layer.

2. The perpendicular magnetic recording head according to claim 1, wherein each of the two side surfaces of the return yoke layer is inclined with respect to a track width direction.

3. The perpendicular magnetic recording head according to claim 1, wherein each of the two side surfaces of the return yoke layer is curved.

4. The perpendicular magnetic recording head according to claim 1, wherein the cohesive layer contains at least one material selected from a group consisting of Ti, Cr, Ta, Zr, and Hf.

5. The perpendicular magnetic recording head according to claim 1, wherein the return yoke layer is composed of Ni—Fe, and the planarized nonmagnetic layer is composed of at least one material selected from the group consisting of $Al_2O_3$, $SiO_2$, Ta, and diamond-like carbon.

6. A perpendicular magnetic recording head, comprising:
   a main magnetic pole layer exposed to an opposing surface opposite a recording medium, applying a perpendicular recording magnetic field to the recording medium;
   a return yoke layer disposed above or below the main magnetic pole layer, the return yoke layer receiving the recording magnetic field returning thereto after passing through the recording medium;
   a magnetoresistive element that read recording information from the recording medium using a magnetoresistance effect; and
   a first shield layer disposed under the magnetoresistive element,
   a second shield layer disposed under the magnetoresitive element,
   wherein each of the first and second shield layers has two side surfaces and a front end surface positioned between the two side surfaces, the front end surface being formed in the opposing surface;
   wherein a width between the two side surfaces increases as a distance from the front end surface increases;
   a first planarized nonmagnetic layer filling the surroundings of the first shield layer,
   a second planarized nonmagnetic layer filling the surroundings of the second shield layer;
   wherein a first cohesive layer is disposed between the first shield layer and the first planarized nonmagnetic layer to increase the cohesive properties between the first shield layer and the first planarized nonmagnetic layer compared with the case in which the first shield layer is directly connected to the first planarized nonmagnetic layer, and
   wherein a second cohesive layer is disposed between the second shield layer and the second planarized nonmagnetic layer to increase the cohesive properties between the second shield layer and the second planarized nonmagnetic layer compared with the case in which the second shield layer is directly connected to the second planarized nonmagnetic layer.

7. The perpendicular magnetic recording head according to claim 6, wherein each of the two side surfaces of the first and second shield layers is inclined with respect to a track width direction.

8. The perpendicular magnetic recording head according to claim 6, each of the two side surfaces of the first and second shield layers is curved.

9. The perpendicular magnetic recording head according to claim 6, wherein each of the first and second cohesive layers contains at least one material selected from a group consisting of Ti, Cr, Ta, Zr, and Hf.

10. The perpendicular magnetic recording head according to claim 6, wherein the return yoke layer and the first and second shield layers are composed of Ni—Fe, and the first and second planarized nonmagnetic layers are composed of at least one material selected from the group consisting of $Al_2O_3$, $SiO_2$, Ta, and diamond-like carbon.

11. A manufacturing method of a perpendicular magnetic recording head, comprising:
    forming a return yoke layer having two side surfaces and a front end surface positioned between the two side surfaces, the front end surface being formed in the opposing surface;
    wherein a width between the two side surfaces increases as a distance from the front end surface increases;
    forming a cohesive layer over an upper surface and the side surfaces of the return yoke layer, the cohesive layer increasing the cohesive properties between the return yoke layer and a planarized nonmagnetic layer to be formed in a subsequent step, compared with the case in which the return yoke layer is directly connected to the planarized nonmagnetic layer;
    forming the planarized nonmagnetic layer on the cohesive layer to such a thickness that the return yoke layer and the surroundings thereof are covered; and
    performing a polishing process to the planarized nonmagnetic layer until the return yoke layer is exposed, thereby planarizing the upper surface of the return yoke layer.

12. The manufacturing method of the perpendicular magnetic recording head according to claim 11, wherein each of the two side surfaces of the return yoke layer is inclined with respect to a track width direction.

13. The perpendicular magnetic recording head according to claim 11, wherein each of the two side surfaces of the return yoke layer is curved.

14. The manufacturing method of the perpendicular magnetic recording head according to claim 11, wherein the cohesive layer contains at least one material selected from a group consisting of Ti, Cr, Ta, Zr, and Hf.

15. The manufacturing method of the perpendicular magnetic recording head according to claim 11, wherein the return yoke layer is composed of Ni—Fe, and the planarized nonmagnetic layer is composed of at least one material selected from the group consisting of $Al_2O_3$, $SiO_2$, Ta, and diamond-like carbon.

16. A manufacturing method of a perpendicular magnetic recording head, comprising:
    forming a first shield layer;
    forming a magnetoresistive element on the first shield layer; and
    forming a second shield layer on the magnetoresistive element;
    wherein each of the first and second shield layers has two side surfaces and a front end surface positioned between the two side surfaces, the front end surface being formed in the opposing surface;
    wherein a width between the two side surfaces increases as a distance from the front end surface increases;
    wherein after forming the first shield layer, forming a cohesive layer over an upper surface and the side surfaces of the first shield layer, the first cohesive layer increasing the cohesive properties between the first shield layer and a first planarized nonmagnetic layer to be formed in a subsequent step, compared with the case in which the first shield layer is directly connected to the first planarized nonmagnetic layer;
    wherein after forming the first cohesive layer, said first planarized nonmagnetic layer is formed on the first cohesive layer to such a thickness that the first shield layer and the surroundings thereof are covered;
    wherein after forming the first planarized nonmagnetic layer is formed, the first planarized nonmagnetic layer is polished until the first shield layers is exposed, thereby planarizing an upper surface of the first shield layer;
    wherein after forming the second shield layer, a second cohesive layer is formed over an upper surface and the side surfaces of the second shield layer, the second cohesive layer increasing the cohesive properties between the second shield layer and a second planarized nonmagnetic layer to be formed in a subsequent step, compare with the case in which the second shield layer is directly connected to the second planarized nonmagnetic layer;
    wherein after forming the second cohesive layer, said second planarized nonmagnetic layer is formed on the second cohesive layer to such a thickness that the second shield layer and the surroundings thereof are covered; and
    wherein after forming the second planarized nonmagnetic layer, the second planarized nonmagnetic layer is polished until the second shield layer is exposed, thereby planarizing an upper surface of the second shield layer.

17. The manufacturing method of the perpendicular magnetic recording head according to claim 16, wherein each of the two side surfaces of the respective first and second shield layers is inclined with respect to a track width direction.

18. The manufacturing method of the perpendicular magnetic recording head according to claim 16, wherein each of the two side surfaces of the respective first and second shield layers is curved.

19. The manufacturing method of the perpendicular magnetic recording head according to claim 16, wherein each of the first and second cohesive layer contains at least one material selected from a group consisting of Ti, Cr, Ta, Zr, and Hf.

20. The manufacturing method of the perpendicular magnetic recording head according to claim 16, wherein the return yoke layer and the first and second shield layers are composed of Ni—Fe, and the first and second planarized nonmagnetic layer is composed of at least one material selected from the group consisting of $Al_2O_3$, $SiO_2$, Ta, and diamond-like carbon.

* * * * *

UNITED STATES PATENT AND TRADEMARK OFFICE
CERTIFICATE OF CORRECTION

PATENT NO. : 8,045,291 B2
APPLICATION NO. : 12/038343
DATED : October 25, 2011
INVENTOR(S) : Kiyoshi Kobayashi et al.

It is certified that error appears in the above-identified patent and that said Letters Patent is hereby corrected as shown below:

In the Claims

In column 12, claim 16, line 25, after "polished until the first shield" replace "layers" with --layer--.

Signed and Sealed this
Sixth Day of March, 2012

David J. Kappos
*Director of the United States Patent and Trademark Office*